US009536554B2

(12) United States Patent
Zuckerman et al.

(10) Patent No.: US 9,536,554 B2
(45) Date of Patent: Jan. 3, 2017

(54) APPARATUS WITH FIRST AND SECOND CLOSE POINTS ON MEDIA-FACING SURFACE OF MAGNETIC HEAD

(71) Applicant: Seagate Technology LLC, Cupertino, CA (US)

(72) Inventors: Neil Zuckerman, Eden Prairie, MN (US); Raul Horatio Andruet, Woodbury, MN (US); James Gary Wessel, Savage, MN (US); Chris Rea, Edina, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/939,023

(22) Filed: Nov. 12, 2015

(65) Prior Publication Data
US 2016/0064029 A1 Mar. 3, 2016

Related U.S. Application Data

(62) Division of application No. 14/206,657, filed on Mar. 12, 2014, now Pat. No. 9,202,490.

(51) Int. Cl.
G11B 5/187 (2006.01)
G11B 5/31 (2006.01)
G11B 5/60 (2006.01)
G11B 5/72 (2006.01)
G11B 5/48 (2006.01)
G11B 33/14 (2006.01)
G11B 5/09 (2006.01)
G11B 5/00 (2006.01)

(52) U.S. Cl.
CPC ............... G11B 5/607 (2013.01); G11B 5/09 (2013.01); G11B 5/1871 (2013.01); G11B 5/314 (2013.01); G11B 5/4866 (2013.01); G11B 5/6088 (2013.01); G11B 5/722 (2013.01); G11B 33/144 (2013.01); G11B 2005/0021 (2013.01)

(58) Field of Classification Search
None
See application file for complete search history.

(56) References Cited

U.S. PATENT DOCUMENTS

| 5,909,340 | A | 6/1999 | Lairson et al. |
| 5,949,612 | A | 9/1999 | Gudeman et al. |
| 7,532,434 | B1 | 5/2009 | Schreck et al. |
| 7,724,474 | B2 | 5/2010 | Maejima et al. |
| 8,842,506 | B1 | 9/2014 | Matsumoto et al. |
| 8,873,353 | B1 | 10/2014 | Riddering |
| 2005/0024775 | A1 | 2/2005 | Kurita et al. |

(Continued)

OTHER PUBLICATIONS

File History for U.S. Appl. No. 14/206,657, filed Mar. 12, 2014 to Zuckerman et al.

Primary Examiner — Craig A. Renner
(74) Attorney, Agent, or Firm — Hollingsworth Davis, LLC

(57) ABSTRACT

A magnetic head includes a read transducer and a write transducer at a media-facing surface of the magnetic head. The magnetic head includes at least one heater that causes heat deformation at the media-facing surface in response to different first and second energizing currents. The first energizing current results in a first close point between the media-facing surface and a recording medium. The second energizing current results in a second close point between the media-facing surface and the recording medium. The second close point is at a different location in the media-facing surface than the first close point.

20 Claims, 5 Drawing Sheets

(56) References Cited

U.S. PATENT DOCUMENTS

2012/0099218 A1    4/2012   Kurita et al.
2012/0201108 A1    8/2012   Zheng et al.
2013/0293984 A1   11/2013   Poss et al.
2014/0362674 A1   12/2014   Tanaka et al.
2015/0262596 A1    9/2015   Zuckerman et al.

APPARATUS WITH FIRST AND SECOND CLOSE POINTS ON MEDIA-FACING SURFACE OF MAGNETIC HEAD

RELATED PATENT DOCUMENTS

This application is a divisional of U.S. Ser. No. 14/206,657, filed Mar. 12, 2014, to which priority is claimed and which is hereby incorporated by reference in its entirety.

BACKGROUND

A heat-assisted, magnetic recording (HAMR) data storage medium uses a high magnetic coercivity material that is able to resist superparamagnetic effects (e.g., thermally-induced, random, changes in magnetic orientations) that currently limit the areal data density of conventional hard drive media. In a HAMR device, a small portion, or "hot spot," of the magnetic medium is locally heated to its Curie temperature, thereby allowing magnetic orientation of the medium to be changed at the hot spot while being written to by a write transducer (e.g., magnetic write pole). After the heat is removed, the region will maintain its magnetic state due to the high coercivity of medium, thereby reliably storing the data for later retrieval.

SUMMARY

The present disclosure is related to apparatus with first and second close points on a media-facing surface of a magnetic head. In one embodiment, an apparatus includes A magnetic head includes a read transducer and a write transducer at a media-facing surface of the magnetic head. The magnetic head includes at least one heater that causes heat deformation at the media-facing surface in response to different first and second energizing currents. The first energizing current results in a first close point between the media-facing surface and a recording medium. The second energizing current results in a second close point between the media-facing surface and the recording medium. The second close point is at a different location in the media-facing surface than the first close point.

In another embodiment, a method involves applying a first energizing current to a heater of a magnetic head responsive to entering a first operational mode of the magnetic head. The first energizing current results in a first close point between the magnetic head and a recording medium. The method further involves applying a different, second energizing current to the heater responsive to entering a second operational mode of the magnetic head. The second energizing current results in a second close point between the magnetic head and the recording medium. The second close point is at a different location on a media-facing surface of the magnetic head than the first close point.

In another embodiment, a magnetic head includes a read transducer at a media-facing surface of the magnetic head and a write transducer at the media-facing surface and located in a downtrack direction relative to the read transducer. A contact pad is disposed at the media-facing surface between the read transducer and the write transducer. The magnetic head includes at least one heater that causes heat deformation at the media-facing surface in response to different first and second energizing currents. The first energizing current results in a first close point between the media-facing surface and a recording medium to be proximate the read transducer. The second energizing current results in a second close point between the media-facing surface and the recording medium to be proximate the contact pad.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is generally related to an apparatus (e.g., a HAMR read/write head) having multiple controllable protrusion regions at a surface of the apparatus (e.g., air bearing surface) that faces a recording media. These protrusion regions, also referred to as close points, can be selectably enabled to cause different regions of the media-facing surface to protrude during different operating modes. For example, different close points may be activated during respective read and write operations of the apparatus. While embodiments described below include HAMR read/write heads, it will be understood that these concepts may be applicable to other devices, including non-HAMR read/write heads.

Figure 1:
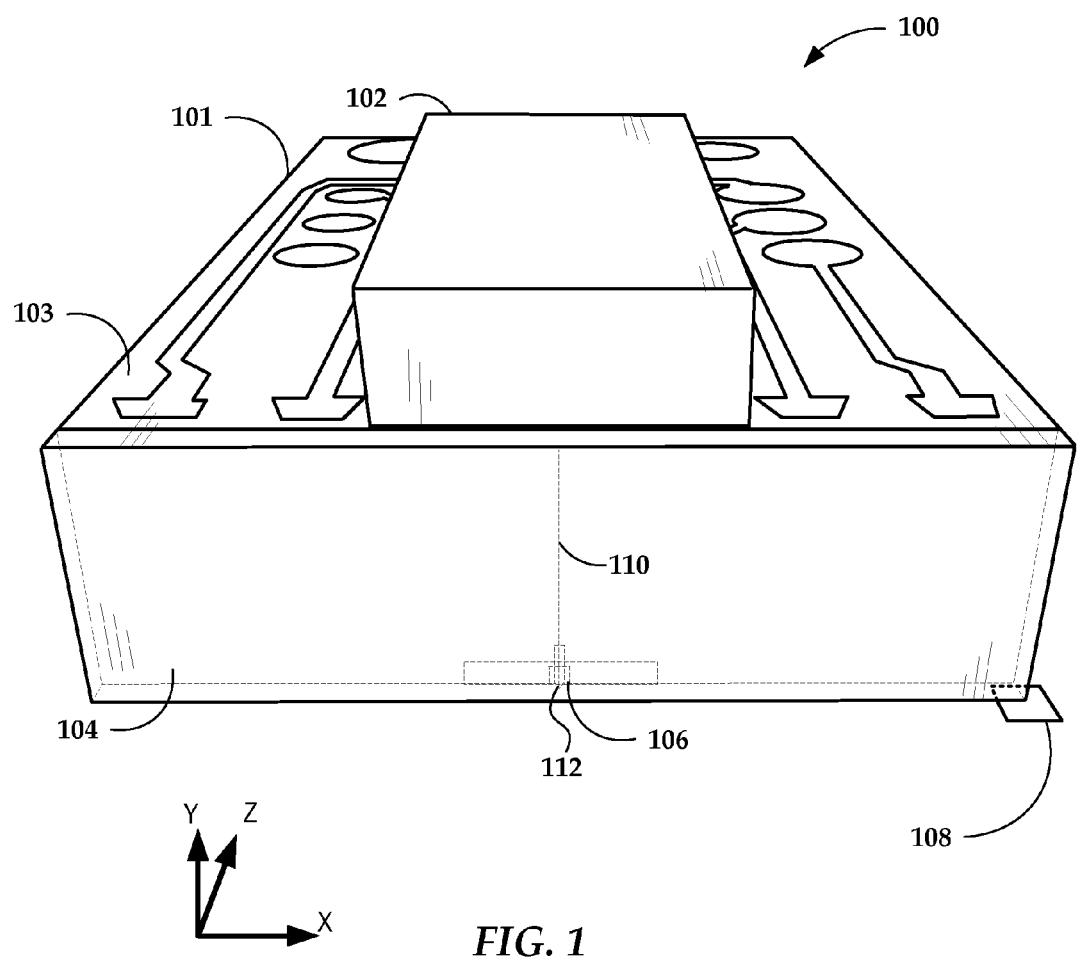
FIG. 1 is a perspective view of a slider assembly according to an example embodiment.

In reference to FIG. 1, a perspective view shows HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media while reading and writing to the media. The media-facing surface 108 may be configured as an air-bearing surface (ABS) that maintains separation from the moving media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, such as a waveguide 110, are formed integrally within the slider body 101 (near a trailing edge surface 104 in this example) and function as an optical path that delivers energy from the laser diode 102 to the recording media via a plasmonic transducer 112. The plasmonic transducer 112 is near the read/write head 106 and causes heating of the media during recording operations. It will be understood the illustrated arrangement of components (e.g., top-mounted laser) is provided for purposes of illustration and not limitation, and the concepts below may be applicable to a variety of HAMR and non-HAMR read/write heads.

Figure 2:
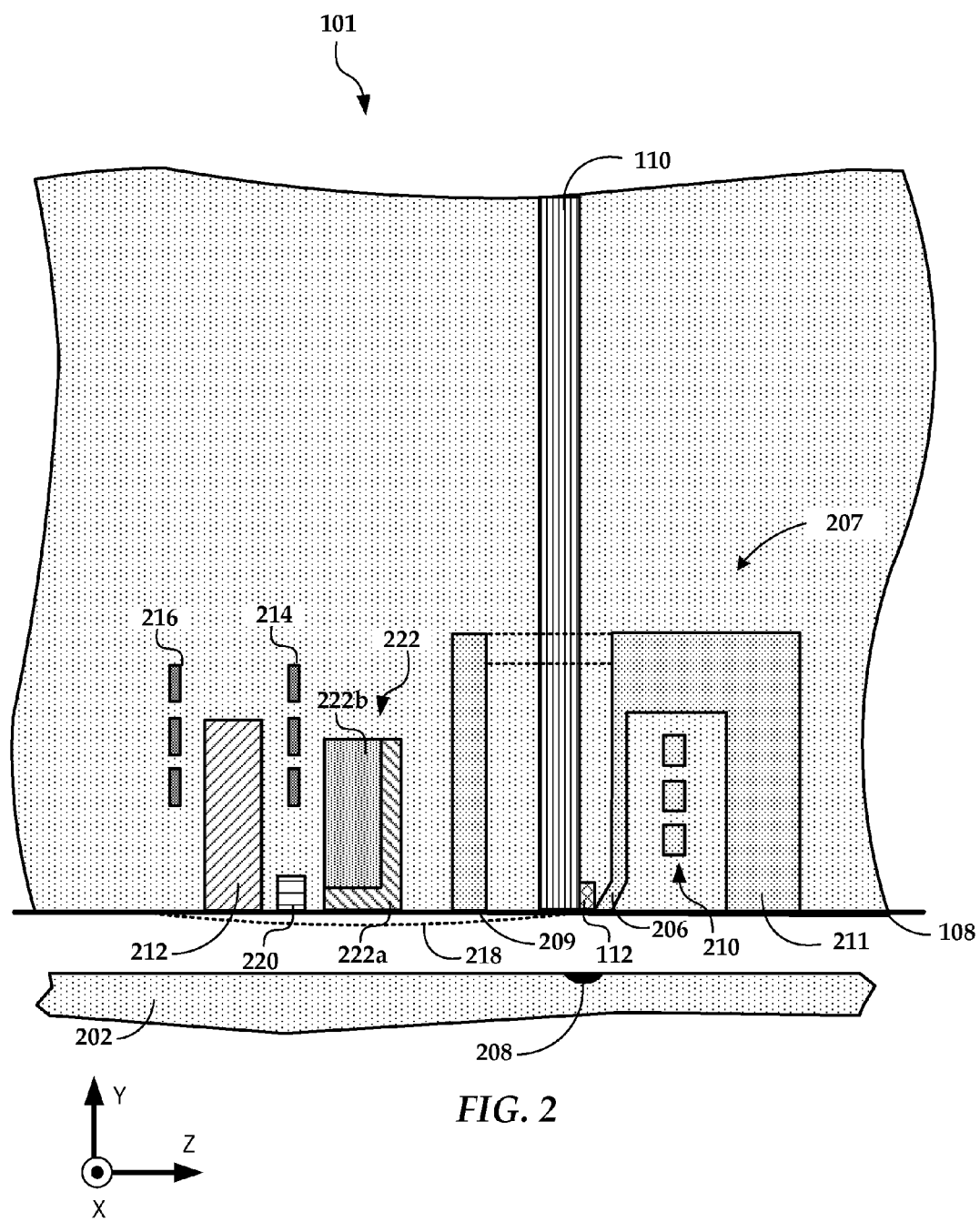
FIG. 2 is a cross-sectional view illustrating portions of a slider body near a plasmonic transducer according to an example embodiment.

In FIG. 2, a cross-sectional view illustrates portions of the slider body 101 near the media-facing surface 108 according to an example embodiment. The plasmonic transducer 112 is shown proximate to a surface of magnetic recording medium 202, e.g., a magnetic disk. The waveguide 110 delivers electromagnetic energy to the plasmonic transducer 112, which directs the energy to create a small hotspot 208 on the medium 202. A magnetic write pole 206 causes changes in magnetic flux near the media-facing surface 108 in response to an applied current. Flux from the write pole 206 changes a magnetic orientation of the hotspot 208 as it moves past the write pole 206 in the downtrack direction (z-direction).

The magnetic write pole 206 is part of a larger write transducer 207, which also includes return poles 211, 209 and coils 210. The write transducer 207 is located downtrack (z-direction in this example) relative to a read transducer 212. The write transducer 207 need not be aligned with the read transducer 212 in a crosstrack direction. The read transducer 212 may include at least a read sensor, e.g., giant magnetoresistive (GMR) stack, tunneling magnetoresistive (TMR) stack, and the like. The read transducer 212 may also include magnetic shields to reduce interference.

Generally, the read transducer 212 and write transducer 207 are kept separated by the medium 202 by a gap (e.g., air gap) during operation. The read transducer 212 and write transducer 207 are designed to operate within a defined separation distance range from the medium 202, and the air gap alone may not control this separation with the desired precision. As such, an additional clearance mechanism is used to finely adjust clearance between transducers 212, 207 and the medium 202.

In this example, one or more heaters 214, 216 are used to actively adjust clearance between transducers 212, 207 and the medium 202. Although two heaters 214, 216 are shown, the embodiments described below may use just one heater at one of the illustrated locations, or elsewhere in the slider body. By applying current to the heaters 214, 216, localized heating of the surrounding material will cause a protrusion at the media-facing surface 108, as indicated by dashed line 218. This protrusion 218 is also referred to as a "close point," in that it is the closest point between the medium 202 and the slider body 101. There may be more than one close point, in which case a "close point" may refer to the closest point to the medium in a specific region, even though there may be other points with smaller clearances elsewhere along the media-facing surface 108.

Changing the close point by the application of current to one or more of the heaters 214, 216 allows selectably adjusting the amount and/or shape of the protrusion 218. In this way, the heaters 214, 216 can be used to control respective clearances between the transducers 212, 207 and the medium 202 during read/write modes. As will be described in greater detail below, application of different first and second currents to at least of the heaters 214 also facilitates changing a location of the protrusion 218, thus causing different close points to occur during different operational modes.

Other components near the media-facing surface 108 may also contribute to protrusion, e.g., influence a location and/or magnitude of the protrusion. For example, the waveguide 110 and NFT 112 can exhibit significant local temperature increases during operation due to absorption of optical energy, thereby increasing protrusion near the NFT 112. The write transducer 207 may also cause a local temperature increase due to resistive and inductive heating caused by the coils 210. Generally, these sources of heat may be relatively predetermined at least during recording due to the need to deliver a particular level of optical energy and magnetic flux to the medium 202. However, some variation may be possible, and other components, such as one or more heaters, may be subject to a varying current that allows fine adjustment of the write-mode clearance.

In order to measure the clearance between the transducers 212, 207 and the medium 202, a controller (not shown) may measure temperatures near the media-facing surface via a temperature sensor 220. The temperature sensor 220 may detect contact and/or proximity between the transducers 212, 207 and the medium 202 by measuring a local temperature. The temperature sensor 220 may have a temperature coefficient of resistance that causes a predictable change in resistance across the sensor responsive to changes in local temperature. The temperature sensor 220 may detect contact and clearance by measuring a change in temperature profile according to a known pattern (e.g., sudden drop in temperature due to initial contact with the medium 202).

Although the slider body 101 is designed to minimize contact between the media-facing surface 108 and the recording medium 202 during operation, some contact may inevitably occur during device operation. The media-facing surface 108 and recoding medium 202 include surface coatings (e.g., diamond-like carbon) to minimize damage due to such impacts. However, if the coating wears away, some components may cause problems if exposed at the media-facing surface. For example, the NFT 112 may be made of gold or some other metal (e.g., silver, aluminum, copper) that causes contamination of the medium 202 and/or media-facing surface 108 if allowed to contact the medium. In another example, the write pole 206 may be configured to be the closest point to the medium 202 during write operations. If the coating wears away from the write pole 206, the exposed material (which includes iron) may become corroded.

In the illustrated embodiment, a contact block 222 is included downtrack between the read transducer 212 and the write transducer 207. The contact block 222 is made of a hard, corrosion-resistant material, and may be exposed or covered, e.g., by a coating, such as diamond-like carbon (DLC). The contact block 222 could be formed from patterned overcoat or could be deposited during wafer-level fabrication.

The contact block 222 may include at least a thin layer 222a near the surface. It may include a relatively thick element, push block 222b, deposited on the wafer, extending into the recording head. A portion of the thin film 222a extends along the push block 222b away from the media-facing surface. If formed at the wafer level, the thin film 222a could be made by first plating a large block of material that forms the push block 222b a fraction of a micron away from the media-facing surface 108, and then coating this block of material with the thin film 222a, such that the film coats the side of the push block 222b.

After dicing and lapping, the thin coated film 222a forms a sheet of material on the media-facing surface 108. The thin film 222a which is exposed at the media-facing surface 108 and the push block 222b may be chosen from materials known to protrude more than the write pole 206 or shields of the read transducer 212. Making the contact block 222 out of a high-protrusion (mechanically hard) material such as Ta or Ru reduces the some thermo-mechanical design constraints. Other materials for the contact block 222 include nonmagnetic metals and dielectrics. The thin film 222a portions exposed at the media-facing surface 108 should be suitable for exposure in a corrosion-sensitive environment. The size of the contact block 222 would be chosen in conjunction with the heater shape to provide the desired level of actuation and area of contact.

Figure 3:
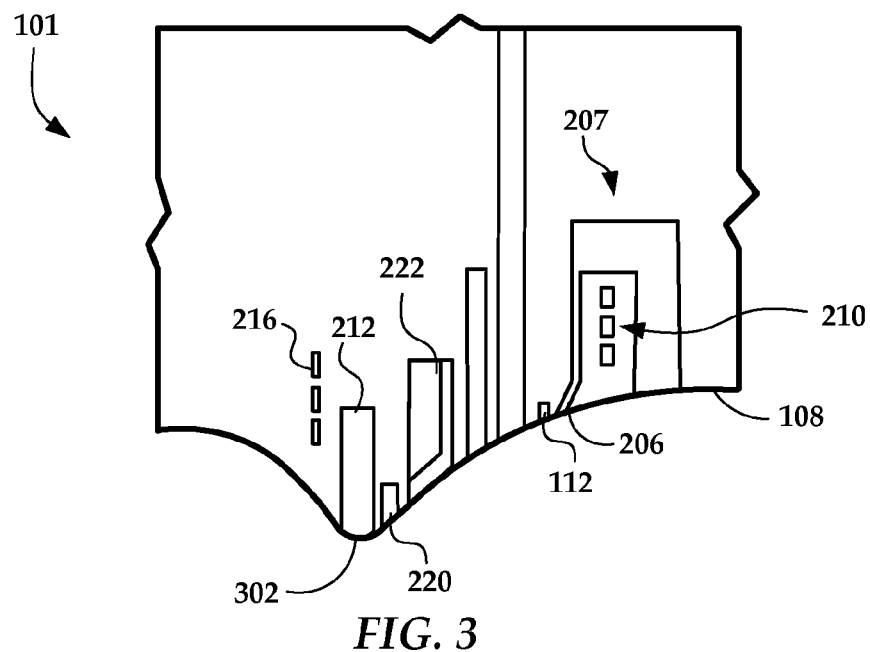
FIGS. 3 and 4 are cross-sectional views of the slider body of FIG. 2 showing different protrusions according to example embodiments.

The use of the contact block 222 facilitates selectably changing a close point region by using different currents energizing the one or more heaters 214, 216. An example of how different close points may be obtained is shown in the block diagrams of FIGS. 3 and 4. In FIG. 3, the block diagram shows an exaggerated protrusion profile used during read operations of a magnetic head (also referred to herein as a read mode). Heater 216 is activated via a first current such that close point 302 protrudes from the media-facing surface 108. Close point 302 is at or near the read transducer 212, which can minimize clearance of the read transducer 212 during read operations.

Figure 4:
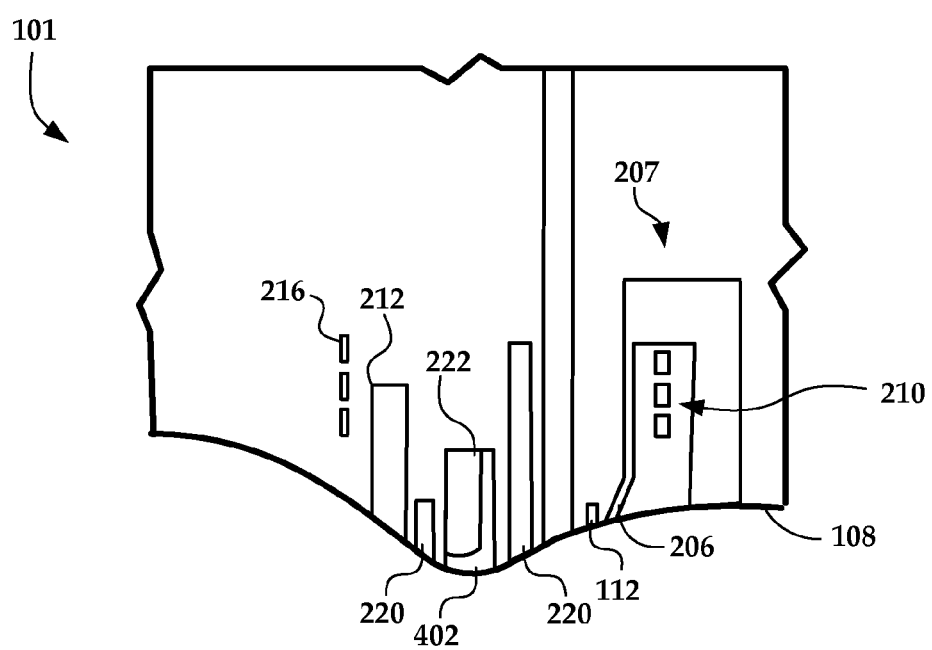

In FIG. 4, the block diagram shows an exaggerated protrusion profile used during write operations of a magnetic head (also referred to herein as a write mode). Heater 216 is activated via a different second current such that close point 402 protrudes from the media-facing surface 108. Close point 402 is at or near the contact block 222. This minimizes the chances that the NFT 112 and/or write pole 206 contacts the recording medium during write operations. The contributions of the NFT 112 and write transducer 207 to local heating at the media-facing surface 108 can help shift the close point 402 towards the contact pad 222 during write operations compared with the close point 302 seen during reading in FIG. 3.

The thermo-mechanical design of the slider body 101 is configured such that when write mode is energized, the close point moves from the reader to the adjacent, downtrack central contact block 222. This may be enabled by positioning the heater 216 sufficiently far uptrack to actuate the reader and contact block portions of the head (yielding low gamma), and relying on the write coils 210 or laser heating to protrude the writer section. It could also be enabled by using more than one heater to control the contact point location. The elevation from the media-facing surface 108 of the writer 207 relative to the contact block 222 is selected to maintain sufficient writer clearance to prevent wear, while positioning the write pole 206 low enough to write. This difference in elevation may be as little as a few nanometers.

By positioning the contact pad immediately downtrack of the reader section, the design produces only a small change in contact point location when changing operating modes. This assists with the function of a clearance or contact-detection device such as a sensor, which depends on proximity to the contact location and the frictional heating caused by contact. In one implementation, a single temperature sensor may be used, positioned between the reader top shield and the uptrack side of the contact pad. This location facilitates minimizing changes in clearance between the temperature sensor and the recording medium when the first and second energizing currents are applied resulting in first and second close points.

While the illustrated close point 302 in FIG. 3 is shown at the read transducer 212, it will be understood that the close point 302 may instead be closer to the contact block 222. For example, the contact block 222 may be elongated along the downtrack direction, so that the first close point 302 corresponds to an end of the contact block 222 near the read transducer 212, and the second close point 402 corresponds to another end of the contact block 222 near the write transducer 207. In such a case, one of the respective read and write transducers 212, 207 may be closer to the media surface than the other during different operational modes, yet in either mode the contact block 222 will be the first part to touch the media in the event of head-to-media contact.

It will be understood that the terms "first and second heater currents" refer generally to an amount of current applied to at least one heater that maintains a desired close point location during first and second operational modes. The heater currents may be varied during operation to account for imperfections in the media, shock/vibration, etc. As such, it may be possible that instantaneous values of the current may be the same in two different operational modes, if only momentarily. However, the average value of the currents over time will be different, resulting in the desired close point location.

Figure 5:
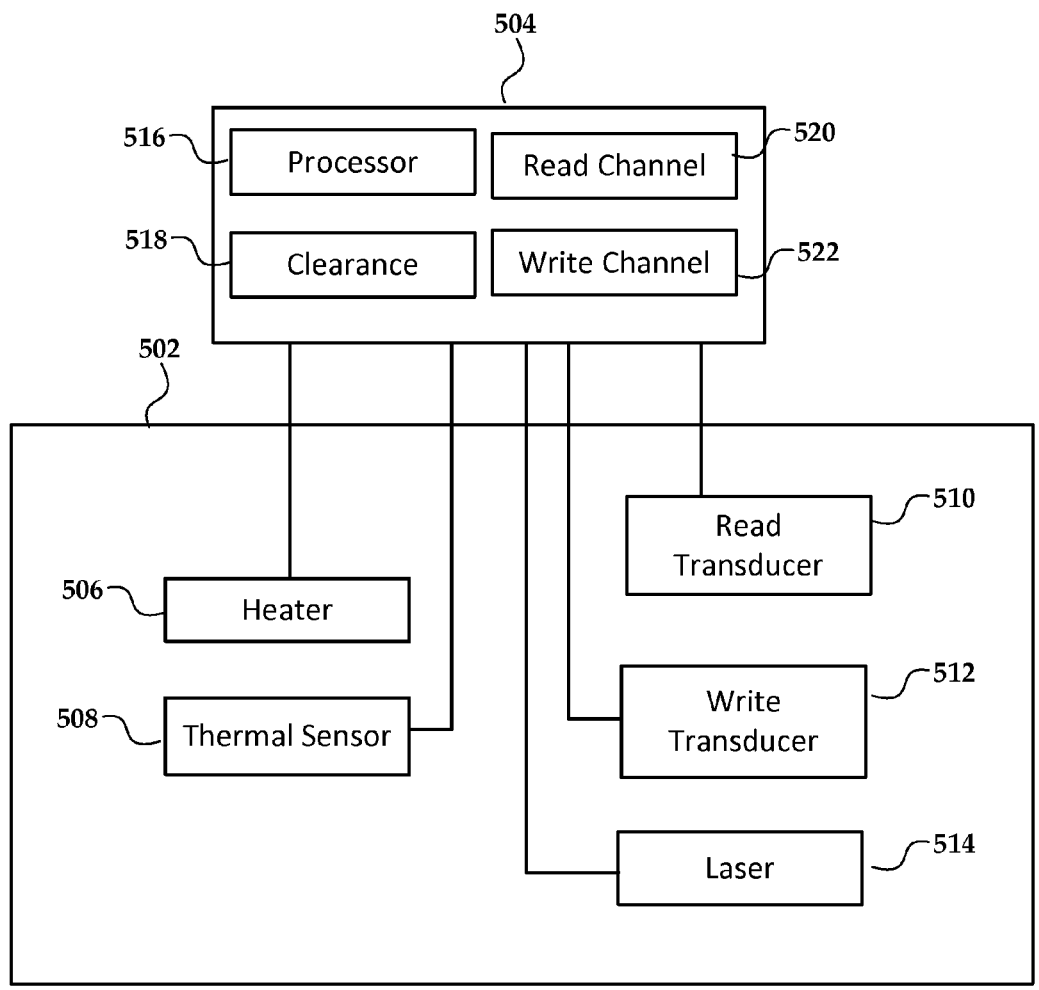
FIG. 5 is a block diagram showing a system according to an example embodiment.

In FIG. 5, a block diagram illustrates a system according to an example embodiment. The system includes a control block 504 coupled to a magnetic read/write head 502. The magnetic read/write head 502 includes a heater 506 used at least to control ABS protrusion of the read/write head 502. The heater 506 may include a combination of components such as resistive heater, a write transducer, and a laser. The laser heats the ABS via an energy path, e.g., waveguide and near-field transducer. The write transducer may include a coil that generates heat when activated. In such a case, a resistive heater may be energized during reads (e.g., activation of read transducer 510) to achieve a first ABS protrusion, and the write coil and/or laser may be energized during writes (e.g., activation of write transducer 512) to achieve a second ABS protrusion. The heater may be activated or deactivated to achieve the second protrusion. Other combinations may be possible. For example, a second heater may be used together with a first heater, write coil, and/or laser, and may include more than two protrusion modes.

A thermal sensor 508 is placed near the ABS (media-facing surface) and provides a signal used by clearance module 518 to control heater 506. More than one thermal sensor may be used. The thermal sensor 508 is used by a clearance module 518 to control ABS protrusion, e.g., detect media-ABS clearance and media-ABS contact. The thermal sensor 508 may be centrally placed so that it does not move significantly relative to the ABS in different modes, e.g., between time periods corresponding to the first and second protrusions.

While the first and second protrusions may be generally associated with read and write modes, other or additional operational modes may have a dedicated protrusion profile. Such operational modes may include seeking, self-test, reading servo wedges, etc. Generally, read and write modes may include any time period during which the read/write head is reading/writing data to the recording medium. Such modes may also include time periods before and after the reading/writing, such as pre- and post-operations (e.g., warm up, stabilization, etc.).

The control block 504 also includes a processor 516. The processor 516 may include logic circuitry operable alone or with software/firmware. The processor 516 may be part of a system-level device (e.g., system on a chip) having multiple, special duty circuit modules. The processor 516 may include analog and digital circuits for, among other things, processing data read from the medium via a read channel 520 and processing data stored to the medium via the write channel 522 and (optionally) laser 514.

The clearance module 518 sends at least first and second energizing currents to the heater 506 resulting in first and second close points between the read/write head 502 and a recording medium. One of the first and second energizing currents may be zero. For example, the current sent to heater 506 may zero at least momentarily during write operations, in which case protrusion is provided by heat from the write transducer 512 and/or the laser 514. The heater 506 may still be activated during write operations to provide fine adjustment of the clearance.

Figure 6:
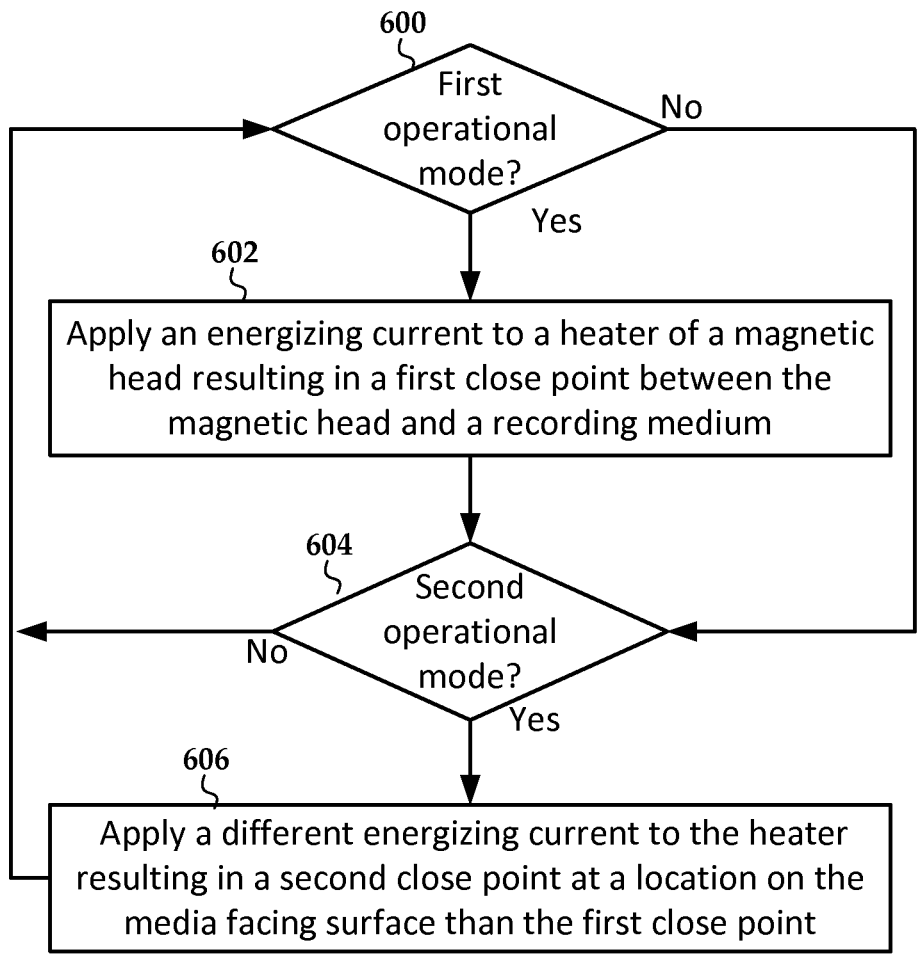
FIG. 6 is a flowchart showing a method according to an example embodiment.

In FIG. 6, a flowchart illustrates a method according to example embodiments. The method involves determining 600 a first operational mode, which may be a read mode, write mode, or other operational mode described herein. If in the first mode, a first energizing current is applied 602 to a heater of a magnetic head resulting in a first close point between the magnetic head and a recording medium. For example, if the first mode is a read mode, the first close point may correspond to (e.g., be proximate to) a read transducer.

A second mode may also be determined as indicated by block 604, in which case a second energizing current as applied 606 to the heater responsive to entering the second operational mode of the magnetic head. The second energizing results in a second close point between the magnetic head and the recording medium, the second close point at a different location on the media-facing surface than the first close point. For example, if the second mode is a write mode, the second close point may correspond to (e.g., be proximate to) a write transducer or a contact pad between the write transducer and read transducer. The second close point in such a case may be influenced (e.g., a location and/or magnitude of the close point is affected by) by the write transducer and/or an energy delivery path used in a HAMR-type device that is activated by a laser or similar energy source.

In some embodiments, the first and second modes may be considered mutually exclusive, e.g., the magnetic head is not in the first and second modes at the same time. This does not exclude the possibility of other modes, in which case the magnetic head may be in neither the first or second operational mode. In other cases, the first and second modes may not be mutually exclusive. In such a case, a weighting factor may be applied to the first and second energizing currents (or some other adjustment performed) that can selectably move the close point over a range of locations.

It will be understood that the use of terms such as top/bottom, first/second, left/right, etc. are not intended to limit the described features to any implied relative importance, absolute orientation, relative order, etc. Unless otherwise stated, terms such as "first" and "second" are used for convenience of description and may be used interchangeably in the description.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
applying a first energizing current to a heater of a magnetic head responsive to entering a first operational mode of the magnetic head, the first energizing current resulting in a first close point between a media-facing surface of the magnetic head and a recording medium, the first close point proximate to a read transducer of the magnetic head; and
applying a different, second energizing current to the heater responsive to entering a second operational mode of the magnetic head, the second energizing current resulting in a second close point between the media-facing surface and the recording medium, the second close point proximate to a contact pad disposed at the media-facing surface between the read transducer and a write transducer of the magnetic head.

2. The method of claim 1, wherein the first and second operational modes comprise respective read and write modes during which the respective read and write transducers of the magnetic head are used for reading and writing to the recording medium.

3. The method of claim 2, further comprising energizing the write transducer during the write mode, wherein the energized write transducer contributes to the heat deformation at the media-facing surface and influences the respective first and second close points.

4. The method of claim 3, further comprising energizing a laser during the write mode, the energized laser contributing to the heat deformation at the media-facing surface and influencing the first and second close points.

5. The method of claim 2, further comprising energizing a laser during the write mode, the energized laser contributing to the heat deformation at the media-facing surface and influencing the first and second close points.

6. The method of claim 1, further applying third and fourth energizing currents to a second heater during the respective first and second operational modes, the first and third energizing currents resulting in the first close point, the second and fourth energizing currents resulting in the second close point.

7. The method of claim 1, wherein the contact pad comprises a push block extending within the magnetic head away from the media-facing surface, the push block formed of a first material with a relatively high coefficient of thermal expansion relative to the read and write transducers.

8. The method of claim 7, wherein the contact pad further comprises a hard, corrosion-resistant coating covering the push block at the media-facing surface.

9. The method of claim 1, further comprising measuring a clearance between the magnetic head and the recording medium via a temperature sensor, and wherein a location of the temperature sensor between the first and second close points minimizes changes in the clearance when the first and second energizing currents are applied resulting in the first and second close points.

10. A method comprising:
applying a first energizing current to a heater of a magnetic head responsive to entering a read mode, the first energizing current resulting in a first close point between a read transducer of the magnetic head and a recording medium; and
applying a different, second energizing current to the heater responsive to entering a write mode of the magnetic head, the second energizing current resulting in a second close point between a contact pad of the magnetic head and the recording medium, the contact pad disposed at a media-facing surface between the read transducer and a write transducer of the magnetic head.

11. The method of claim 10, further comprising energizing the write transducer during the write mode, wherein the energized write transducer contributes to the heat deformation at the media-facing surface and influences the respective first and second close points.

12. The method of claim 10, further comprising energizing a laser during the write mode, the energized laser contributing to the heat deformation at the media-facing surface and influencing the first and second close points.

13. The method of claim 10, further applying third and fourth energizing currents to a second heater during the respective read and write modes, the first and third energizing currents resulting in the first close point, the second and fourth energizing currents resulting in the second close point.

14. The method of claim 10, wherein the contact pad comprises a push block extending within the magnetic head away from the media-facing surface, the push block formed of a first material with a relatively high coefficient of thermal expansion relative to the read and write transducers.

15. The method of claim 14, wherein the contact pad further comprises a hard, corrosion-resistant coating covering the push block at the media-facing surface.

16. The method of claim 10, further comprising measuring a clearance between the magnetic head and the recording medium via a temperature sensor, and wherein a location of the temperature sensor between the first and second close points minimizes changes in the clearance when the first and second energizing currents are applied resulting in the first and second close points.

17. A method comprising:
    applying first and second energizing currents to respective first and second heaters of a magnetic head responsive to entering a read mode, the first and second energizing currents resulting in a first close point between a read transducer of the magnetic head and a recording medium; and
    applying a different, third and fourth energizing currents to the respective first and second heaters responsive to entering a write mode of the magnetic head, the third and fourth energizing currents resulting in a second close point between a contact pad of the magnetic head and the recording medium, the contact pad disposed at a media-facing surface between the read transducer and a write transducer of the magnetic head.

18. The method of claim 17, further comprising energizing one or both of the write transducer and a laser during the write mode, the energized laser and energized write transducer contributing to the heat deformation at the media-facing surface and influencing the first and second close points.

19. The method of claim 17, wherein the contact pad comprises:
    a push block extending within the magnetic head away from the media-facing surface, the push block formed of a first material with a relatively high coefficient of thermal expansion relative to the read and write transducers; and
    a hard, corrosion-resistant coating covering the push block at the media-facing surface.

20. The method of claim 17, further comprising measuring a clearance between the magnetic head and the recording medium via a temperature sensor, and wherein a location of the temperature sensor between the first and second close points minimizes changes in the clearance when the first, second, third and fourth energizing currents are applied resulting in the first and second close points.

* * * * *